United States Patent
Kamath et al.

(10) Patent No.: US 10,784,931 B2
(45) Date of Patent: Sep. 22, 2020

(54) ASSISTED MULTI-USER MULTI-INPUT MULTI-OUTPUT (MU-MIMO) COMMUNICATION SYSTEM

(71) Applicant: Apple Inc., Cupertino, CA (US)

(72) Inventors: Raghuram C. Kamath, San Jose, CA (US); Diego C. Hernandez, San Mateo, CA (US); Harneet Singh Oberoi, San Jose, CA (US); Indranil S. Sen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/003,986

(22) Filed: Jun. 8, 2018

(65) Prior Publication Data

US 2019/0379435 A1 Dec. 12, 2019

(51) Int. Cl.
| | |
|---|---|
| *H04W 72/14* | (2009.01) |
| *H04B 7/0452* | (2017.01) |
| *H04L 29/06* | (2006.01) |
| *H04W 40/04* | (2009.01) |
| *H04W 84/12* | (2009.01) |

(52) U.S. Cl.
CPC .......... *H04B 7/0452* (2013.01); *H04L 69/18* (2013.01); *H04W 40/04* (2013.01); *H04W 84/12* (2013.01)

(58) Field of Classification Search
CPC ...... H04B 7/0452; H04L 69/18; H04W 40/04; H04W 84/12
See application file for complete search history.

(56) References Cited

U.S. PATENT DOCUMENTS

| | | | |
|---|---|---|---|
| 9,813,123 B2 | 11/2017 | Nam et al. | |
| 2006/0073827 A1* | 4/2006 | Vaisanen | H04W 36/0055 455/436 |
| 2013/0301551 A1* | 11/2013 | Ghosh | H04W 72/042 370/329 |
| 2014/0204834 A1* | 7/2014 | Singh | H04W 40/22 370/315 |
| 2014/0269493 A1* | 9/2014 | Forenza | H04B 7/0456 370/328 |
| 2015/0016379 A1* | 1/2015 | Nam | H04B 7/0617 370/329 |
| 2015/0036521 A1* | 2/2015 | Minamino | H04W 48/16 370/252 |

(Continued)

OTHER PUBLICATIONS

International Search Report and Written Opinion for PCT Application No. PCT/US2019/034671 dated Aug. 12, 2019; 17 pgs.

*Primary Examiner* — Edan Orgad
*Assistant Examiner* — Malick A Sohrab
(74) *Attorney, Agent, or Firm* — Fletcher Yoder PC

(57) ABSTRACT

Systems, methods, and devices for grouping client devices based on sensor data in an assisted wireless communication system are provided. Sensor data may include device mobility, device type, and device application data usage, among other characteristics. An assisted wireless communication system may include client devices sending data to an access point. The clients may send conventional protocol data over a channel and, concurrently, send sensor data over an alternative channel. In some cases, client devices may exchange their protocol data, modify their own protocol data based on the exchanged data, and send the modified protocol data to the access point. This may allow the clients to adjust their grouping.

20 Claims, 14 Drawing Sheets

(56) References Cited

U.S. PATENT DOCUMENTS

| | | |
|---|---|---|
| 2015/0141005 A1 | 5/2015 | Suryavanshi et al. |
| 2016/0261328 A1* | 9/2016 | Kim .................... H04B 7/0632 |
| 2016/0315672 A1 | 10/2016 | Patwardhan |
| 2017/0135085 A1 | 5/2017 | Kaushik |
| 2017/0171253 A1* | 6/2017 | Pierce ................. H04L 65/1096 |
| 2018/0049123 A1 | 2/2018 | Park et al. |
| 2018/0070345 A1* | 3/2018 | Kaushik ............. H04W 72/046 |
| 2019/0141620 A1* | 5/2019 | Pujari ................... H04W 48/16 |

* cited by examiner

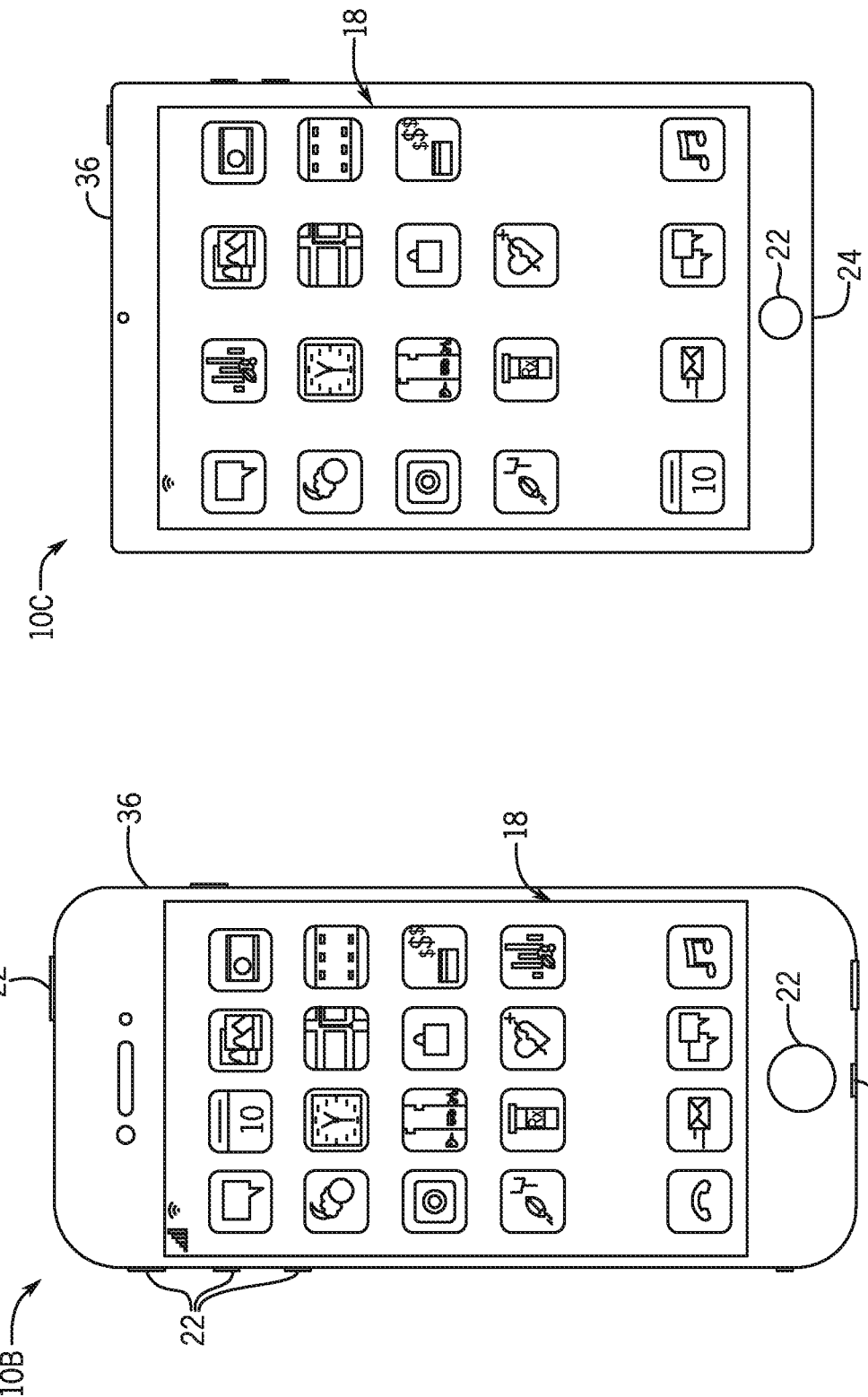

ASSISTED MULTI-USER MULTI-INPUT MULTI-OUTPUT (MU-MIMO) COMMUNICATION SYSTEM

BACKGROUND

The present disclosure relates generally to techniques for facilitating communication between multi-user (MU) multiple-input multiple-output (MIMO) devices in a wireless communication system and, more particularly, to techniques for improving multi-user multiple-input multiple-output (MU-MIMO) performance by managing MU groups.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Wireless devices in a wireless communication system transmit and receive signals for a variety of reasons. For example, a number of wireless devices in a home or business location may use wireless signals to stream movies and music, send emails and text messages, and communicate website data—often at roughly the same time. The wireless devices may use wireless signals to communicate with a wireless access point that is connected to the Internet or other network. The wireless signals may occupy certain portions of an electromagnetic frequency spectrum, but the available electromagnetic frequency spectrum may be limited. Moreover, as the demand for wireless communication systems continues to expand, there are increasing challenges to improve spectrum usage efficiency. For example, wireless networks that employ the Wi-Fi standards (i.e., networks that complies with one or more of the IEEE 802.11 standards) may use standard available channels (e.g., 2.4 GHz or 5.8 GHz), which may limit the available bandwidth and/or the number of devices that can connect to the network.

MU-MIMO, an enhanced wireless communication technology, increases the efficiency of a traditional wireless communication system by using an additional degree of freedom in a space domain via multiple antennas. For example, in a Wi-Fi network, an access point managing the MU-MIMO network may use multiple transmitters and receivers to transfer more data to multiple clients at the same time, employing beamforming to spatially direct the wireless data transmission. To that end, the protocol for MU-MIMO networks may include a method to determine radio frequency (RF) characteristics of the clients (i.e., the RF characteristics of the channel established between the access point and the clients), and to form groups of clients based on similarities in the RF characteristics of the receivers. The clients within a group may benefit from exchanging data with the access point through a dedicated beamformed data link (e.g., channel) based on the RF characteristics of each client.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments described herein are related to wireless communication systems with an access point configured to concurrently receive protocol packets containing protocol data and/or complementary packets containing complementary data from client devices of the wireless communication system. By way of example, the wireless communication system may allow the client devices to communicate data over one or more channels of a wireless network and may include an access point that receives protocol data over a channel (e.g., a Wi-Fi channel) and complementary data over an alternative channel (e.g., a wireless direct link). The protocol data may provide the radiofrequency (RF) characteristics to the access point. The complementary data communicated over the second channel may indicate client mobility (e.g., static versus dynamic), client device types, and/or application data usage (e.g., high, medium, or low bandwidth usage).

In an embodiment, the access point may group like clients (e.g., clients that share client mobility characteristics, client device type, application data usage characteristics) together based on the complementary data in addition to protocol data and adjust bandwidth usage to the group. In an embodiment, the clients may exchange protocol data with each other over an alternative channel. After a client acquires another client's protocol data with its RF characteristics, it may modify its own protocol data before replying to the access point. This may allow a client to assist in the formation of groups by the access point by allowing the client to override or adjust its membership to a beamforming group. In yet another embodiment, the access point may create a RF map indicating channel usage and RF characteristics of clients or groups, receive the RF map data on an alternative channel, and then regroup or reevaluate grouping based on the RF map data received.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 3 is a front view of a hand-held device representing another embodiment of the electronic device of FIG. 1;

FIG. 4 is a front view of another hand-held device representing another embodiment of the electronic device of FIG. 1;

DETAILED DESCRIPTION OF SPECIFIC EMBODIMENTS

Figure 1:
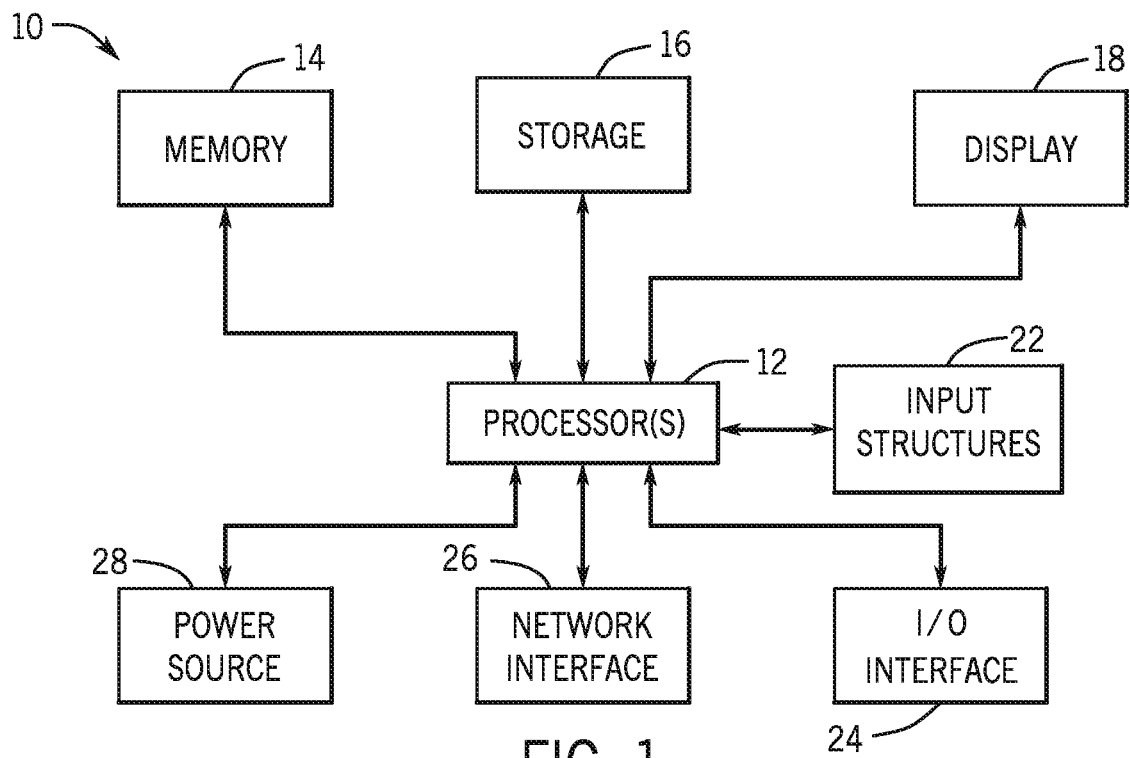
FIG. 1 is a schematic block diagram of an electronic device that may benefit from communicating in an assisted MU-MIMO wireless communication system, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As discussed above, grouping of clients may allow for effective data transmission in wireless networks. For example, conventional MU-MIMO architecture allows for an access point to communicate with multiple clients simultaneously, by employing targeted data transmission using beamforming. To that end, conventional MU-MIMO systems may comply with protocols that include methods for client devices to provide the RF characteristics of the client device to the access point or wireless router. The RF characteristics may include information about the wireless channel established between the access point and the client device, and may be used by the access point to transmit wireless data in a targeted manner, using beamforming. The RF characteristics of a client may be related, for example, to the relative location of the client with respect to the access point, the presence of RF obstacles (e.g., walls, structures, bodies of water, atmospheric perturbation). Using the received RF characteristics, the access point may form groups of clients that may have similar RF characteristics, and may communicate with clients in a group using a targeted beamformed data link.

The RF characteristics-based grouping described above may, however, lead to certain inefficiencies. Clients that have similar RF characteristics and, thus, are grouped together in the conventional MU-MIMO architecture, may have large discrepancies in their data usage, latency specification, bandwidth consumption, etc. As a result of these discrepancies, data distribution may be inefficient. Moreover, certain devices may be mobile, and may, thus change their physical location frequently. Such devices may generate additional challenges for conventional MU-MIMO grouping mechanisms, as their presence may lead to frequent regrouping. To address these challenges, and improve the efficiency of MU-MIMO architectures, systems may use complementary information to improve grouping efficiency.

Complementary information may include sensor data, obtained from sensors in a device. Sensor data may include, for example, information associated to application data usage, relative bandwidth usage among clients, mobility of device, and/or device type. The complementary information may, in addition to RF channel characteristics provided by the conventional protocol data, allow an access point to group together clients that share, for example, mobility or data usage characteristics. Complementary data may also include shared protocol data among clients that can be used for coordination of the grouping process. Such coordination may be used, for example, in situations in which the access point is not configured to process sensor data. The information provided by the complementary data may allow the access point or the client devices to intelligently form groups of client devices to maximize the use of antennas and bandwidth.

To improve grouping, as discussed above, embodiments presented herein describe client devices and access points that may be used in an assisted MU-MIMO wireless communication system. In the assisted MU-MIMO wireless communication systems described herein, the devices may send complementary data (e.g., complementary packets), such as device mobility, device type, and/or device data usage data, to the access point, in addition to RF characteristics used in the conventional MU-MIMO protocols, in a manner that preserves backward compatibility. For example, in certain embodiments, the client may send protocol data (e.g., protocol packets) to the access point on a network channel, and concurrently, another client may send the complementary data to the access point using an alternative channel. In certain embodiments, two clients may share complementary data between them over the alternative channel while they communicate with the access point over the network channel. The use of the alternative channel for the exchange of complementary data, along with the use of the network channel for exchange of protocol data, may allow electronic devices that comply with conventional MU-MIMO to join the assisted MU-MIMO wireless communication system.

As discussed above, certain embodiments may employ an assisted MU-MIMO wireless communication system that includes a network channel to exchange conventional data and an alternative channel to exchange additional data. For example, an assisted MU-MIMO wireless communication system may comply with a Wi-Fi protocol (e.g., an IEEE 802.11 compliant protocol) as the network channel and may employ, for example, a wireless direct link, such as Apple Wireless Direct Link (AWDL), AirDrop, or Bluetooth, as the alternative channel. In some embodiments, the alternative channel may be an encrypted communication link transmitted over the network channel (e.g., an encrypted wireless network over a Wi-Fi protocol).

Furthermore, due to the backward compatibility of certain embodiments described herein, the assisted MU-MIMO wireless communication systems may include some electronic devices that are configured to access both the network channel and the alternative channel, and other electronic devices that are configured to access the network channel but are not configured to access the alternative channel. In the descriptions used herein, first party devices refer to devices (e.g., access points, clients) that are configured to access both the network channel and the alternative channel, while third-party devices refer to devices (e.g., access points, clients) that are not configured to access the alternative channel. The configuration to access the alternative channel may be related to encryption (e.g., secure network), authenticated access (e.g., encrypted network), or proprietary information associated with the electronic device (e.g., a proprietary wireless protocol).

Further enhancements in the assisted MU-MIMO wireless communication system include the ability of first party clients to share protocol data to each other, via the alternative channel. The sharing of protocol data may allow first party clients to coordinate and generate modified protocol data to be returned to an access point. As a result, first-party clients may effectively manage groupings, and ensure that they are in a single group or ensure that they are not in a single group. The first party clients may share their protocol data with each other on an alternative channel (e.g., wireless direct link) concurrently with another first party or third-party client sending its protocol data to the access point using another channel (e.g., Wi-Fi channel).

As discussed in greater detail below, some of the techniques for client devices communicating their sensor data to the access point and their protocol data to other first party clients occur simultaneously. Since conventional MU-MIMO wireless communication system allows for multiple clients to communicate protocol data to the access point (e.g., RF characteristics of device) on a channel, first party clients may simultaneously transmit sensor data on an alternative channel, such as a wireless direct link between the clients and the access point, preserving backwards compatibility and not adding any additional latency to the grouping process.

With the foregoing in mind, a general description of suitable electronic devices that may communicate in an assisted MU-MIMO wireless communication system will be provided below. Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24, a network interface 26, and a power source 28. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
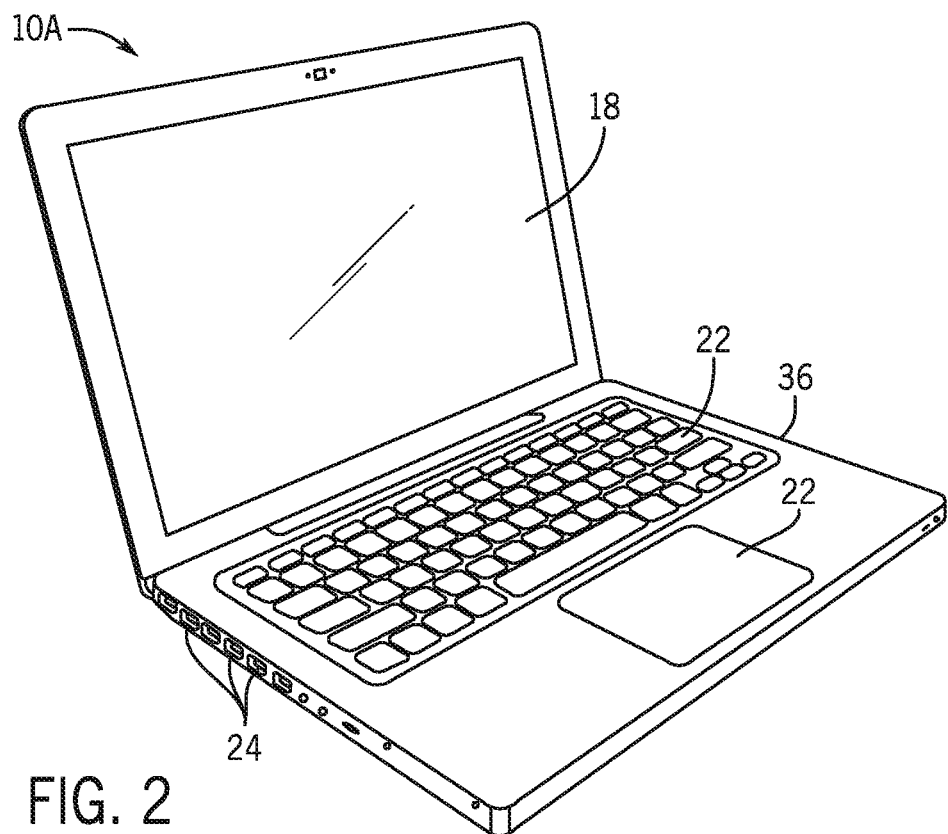
FIG. 2 is a perspective view of a notebook computer representing an embodiment of the electronic device of FIG. 1.
Figure 5:
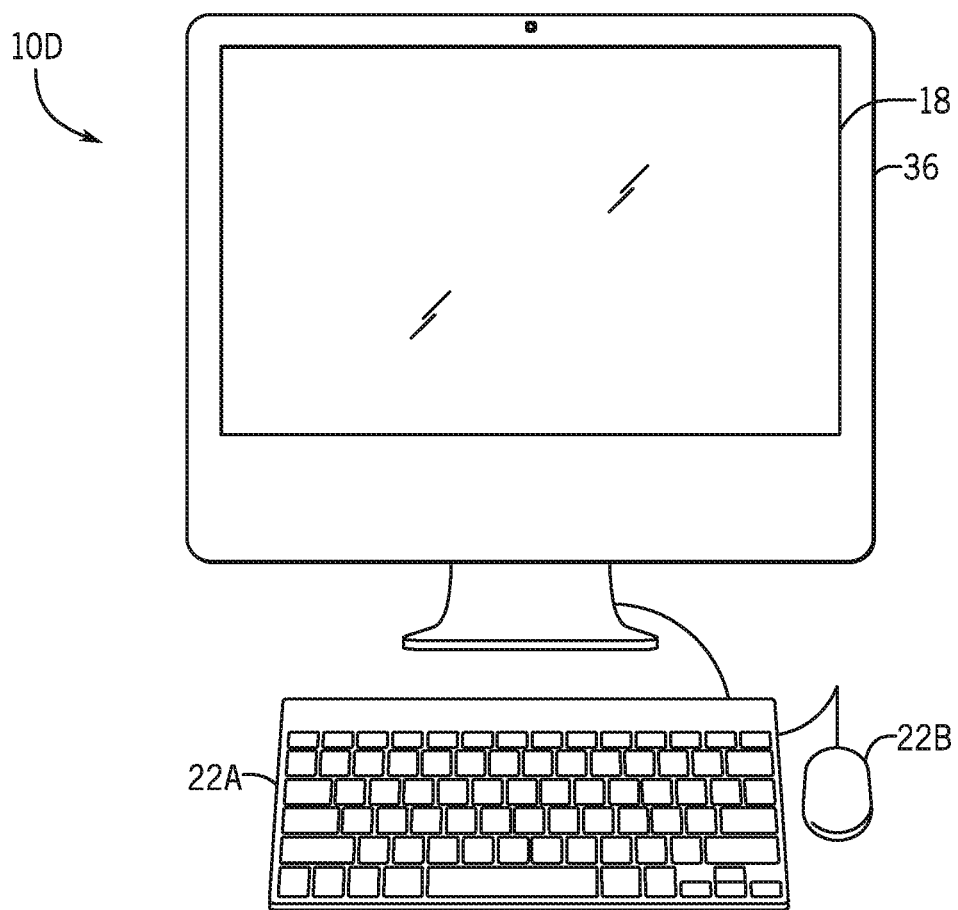
FIG. 5 is a front view of a desktop computer representing another embodiment of the electronic device of FIG. 1.
Figure 6:
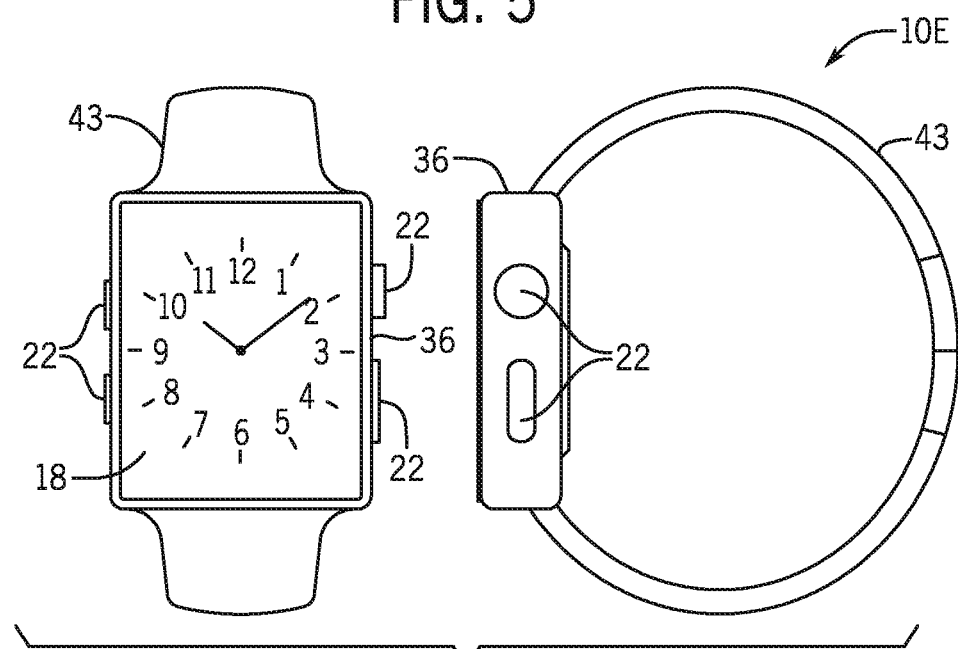
FIG. 6 is a front view and side view of a wearable electronic device representing another embodiment of the electronic device of FIG. 1.
Figure 7:
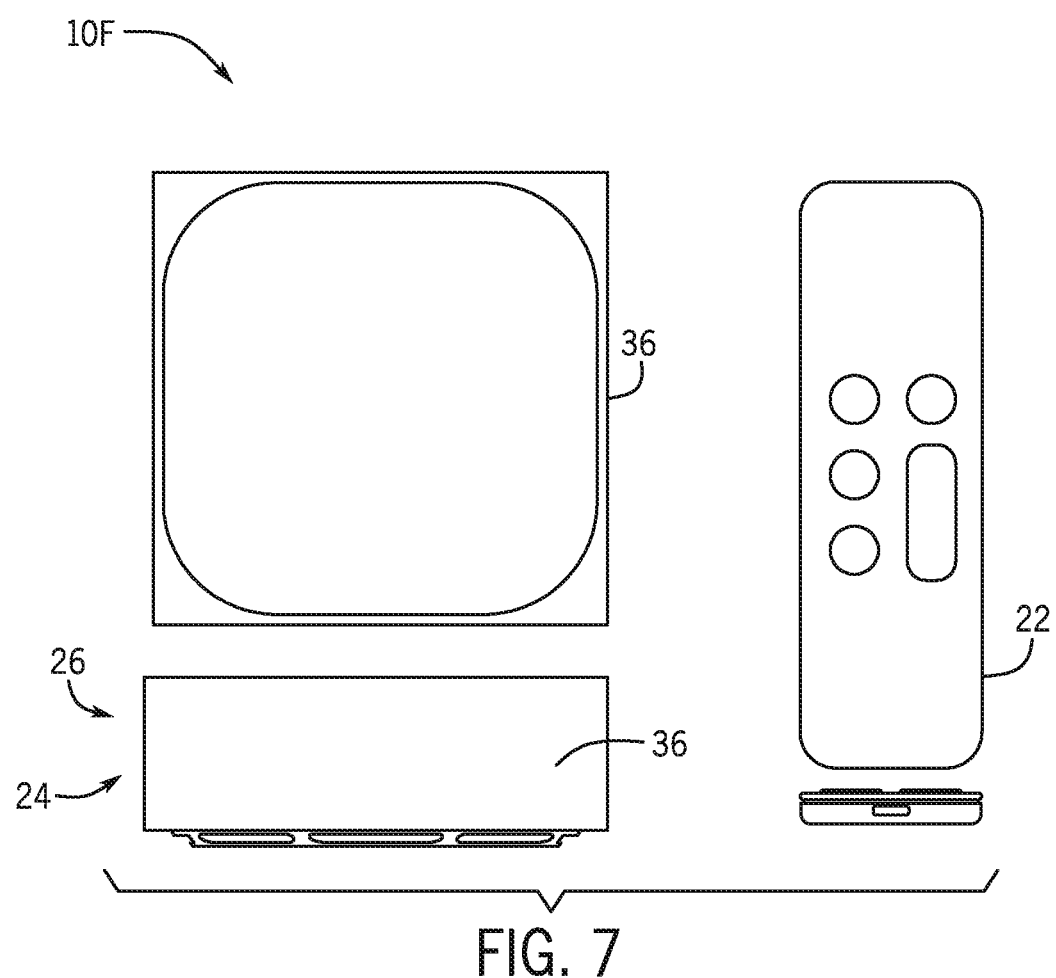
FIG. 7 is a front view and side view of a media center device representing another embodiment of the electronic device of FIG. 1.
Figure 9:
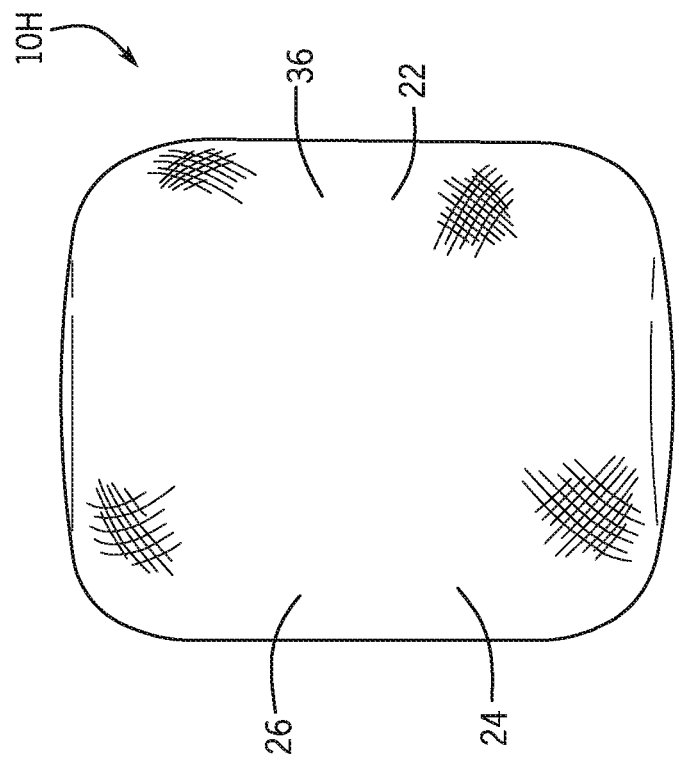
FIG. 9 is a front view of a smart speaker with an intelligent home assistant representing another embodiment of the electronic device of FIG. 1.
Figure 8:
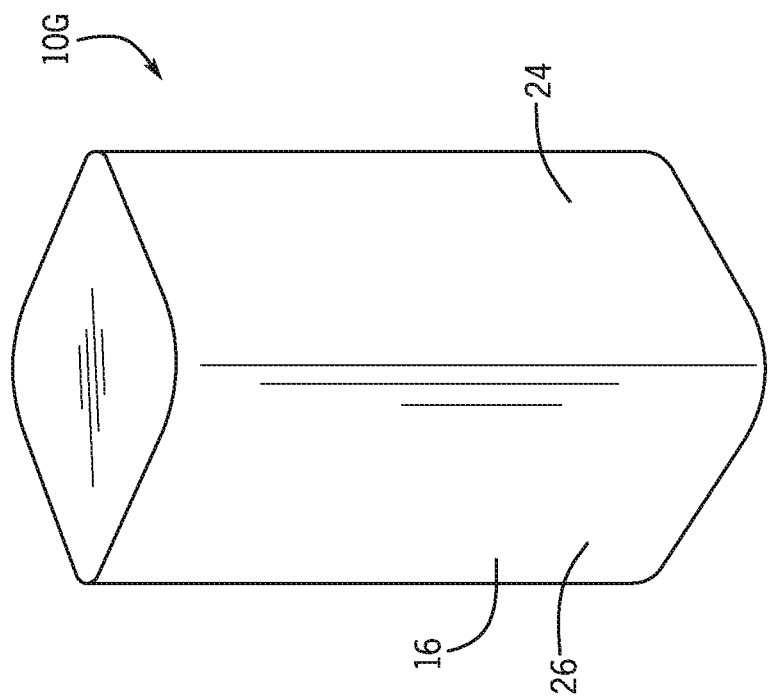
FIG. 8 is a front view and side view of an electronic access point representing another embodiment of the electronic device of FIG. 1.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, the media center device in FIG. 7, the electronic access point in FIG. 8, the intelligent home assistant in FIG. 9, or similar devices. It should be noted that the processor(s) 12 and other related items in FIG. 1 may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 may be operably coupled with the memory 14 and the nonvolatile storage 16 to perform various algorithms. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor(s) 12 to enable the electronic device 10 to provide various functionalities.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26.

The network interface 26 may include, for example, one or more interfaces for a personal area network (PAN), such as a Bluetooth network, for a local area network (LAN) or wireless local area network (WLAN), such as an 802.11x Wi-Fi network, and/or for a wide area network (WAN), such as a 3rd generation (3G) cellular network, 4th generation (4G) cellular network, long term evolution (LTE) cellular network, long term evolution license assisted access (LTE-LAA) cellular network, or wireless direct link, such as Apple Wireless Direct Link (AWDL) or AirDrop. The network interface 26 may also include one or more interfaces for, for example, broadband fixed wireless access networks (Wi-MAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra-Wideband (UWB), alternating current (AC) power lines, and so forth. Network interface 26, such as the one described above, may allow access to the MU-MIMO wireless communication systems described herein. As further illustrated, the electronic device 10 may include a power source 28. The power source 28 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations, and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 10A, is illustrated in FIG. 2. The depicted computer 10A may include a housing or enclosure 36, a display 18, input structures 22, and ports of an I/O interface 24. In one embodiment, the input structures 22 (such as a keyboard and/or touchpad) may be used to interact with the computer 10A, such as to start, control, or operate a GUI or applications running on computer 10A. For example, a keyboard and/or touchpad may allow a user to navigate a user interface or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, Calif. The handheld device 10B may include an enclosure 36 to protect interior components from physical damage and to shield them from electromagnetic interference. The enclosure 36 may surround the display 18. The I/O interfaces 24 may open through the enclosure 36 and may include, for example, an I/O port for a hardwired connection for charging and/or content manipulation using a standard connector and protocol, such as the Lightning connector provided by Apple Inc., a universal service bus (USB), or other similar connector and protocol.

User input structures 22, in combination with the display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control or may toggle between vibrate and ring modes. The input structures 22 may also include a microphone may obtain a user's voice for various voice-related features, and a speaker may enable audio playback and/or certain phone capabilities. The input structures 22 may also include a headphone input may provide a connection to external speakers and/or headphones. The I/O interfaces 24 of the handheld device 10B may include a physical interface to charge the handheld device 10B or communicate data to or from the handheld device 10B.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, Calif. The handheld device 10C may also include an enclosure 36 that holds the electronic display 18. Input structures 22 may include, for example, a hardware or virtual home button. The I/O interfaces 24 of the handheld device 10C may include a physical interface to charge the handheld device 10C or communicate data to or from the handheld device 10C.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. It should be noted that the computer 10D may also represent a personal computer (PC) by another manufacturer. A similar enclosure 36 may be provided to protect and enclose internal components of the computer 10D such as the display 18. In certain embodiments, a user of the computer 10D may interact with the computer 10D using various peripheral input devices, such as the keyboard 22A or mouse 22B (e.g., input structures 22), which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple, Inc. More generally, the wearable electronic device 10E may be any wearable electronic device such as, for example, a wearable exercise monitoring device (e.g., pedometer, accelerometer, heart rate monitor), or other device by another manufacturer. The display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E.

FIG. 7 depicts a front view and a side view of a media center device 10F, which represents one embodiment of the electronic device 10. By way of example, the media center device 10F may be a model of an Apple TV 4K available from Apple Inc. of Cupertino, Calif., or any other media center device with wireless capabilities. The media center device 10F may include an enclosure 36 to protect interior components from physical damage and to shield them from electromagnetic interference. A similar enclosure 36 may be provided to protect and enclose internal components of the media center device 10F. The network interface 26 of the media center device 10F may allow the device to connect to a network via one or more interfaces (e.g., 802.11x Wi-Fi network, Bluetooth, and/or wireless direct link to first party devices). The I/O interfaces 24 may open through the enclosure 36 and may include, for example, an I/O port for a hardwired connection to a network, an HDMI port, audio port, or other similar audio and video connector and protocol.

User input structures 22 may allow a user to control the media center device 10F. For example, the input structures 22 may activate or deactivate the media center device 10F, navigate user interface to a home screen, a user-configurable application screen, navigate between network or streaming channels, navigate between viewing modes (e.g., 4K Standard Dynamic Range (SDR), 4K High Dynamic Range, (HDR), etc.), provide volume control, and/or activate a voice-recognition feature of the media center device 10F.

Turning to FIG. 8, an electronic access point 10G may represent another embodiment of the electronic device 10 of FIG. 1. The access point 10G may be any access point that allows a wireless device to connect to a wired network. The access point 10G may be connected to a router (via a wired network) as a standalone device, or it may also be an integral component of the router itself. The access point 10G may transmit at both the 2.4 GHz and 5 GHz frequency at the same time, allowing for best available frequency band for connecting with a device or multiple devices. The access point 10G may have a beamforming antenna array, allowing for the access point 10G to determine RF characteristics of a device and target signal to the device located. By way of example, the access point 10G may be an AirPort Extreme device by Apple Inc. of Cupertino, Calif.

A network interface 26 in the access point 10G may allow network client devices to connect to the access point 10G via one or more interfaces (e.g., 802.11x Wi-Fi network, Bluetooth, and/or wireless direct link to first party devices). An enclosure 36 may be provided to protect and enclose internal components of the access point 10G. The access point 10G may include an enclosure 36 to protect interior components from physical damage and to shield them from electromagnetic interference. The I/O interfaces 24 may open through the enclosure 36 and may include, for example, an I/O port for a hardwired connection to a network. Additionally, user input structures 22 may allow a user to control the access point 10G. For example, the input structures 22 may activate or deactivate the access point 10G, configure frequency bands, channels, or band availabilities, connect to a network, and/or connect devices to the network. The nonvolatile storage 16 may include storing configurations (e.g., network name and passwords, activated or deactivated frequency band capabilities, etc.).

FIG. 9 depicts a front view of an intelligent home assistant 10H, which represents one embodiment of the electronic device 10. The intelligent home assistant 10H may represent, for example, a speaker device with home assistant and wireless capabilities. The intelligent home assistant 10H may also include soundwave beamforming capabilities as detailed below. The soundwave beamforming may allow for the microphone of the intelligent home assistant 10H to detect an audio source and target audio capture, allowing the microphone to be heard over simultaneous audio transmitted from the intelligent home assistant 10H. The soundwave beamforming may further allow the intelligent home assistant 10H to direct sound beamed into the middle of the room while ambient sound is diffused into right and left channels and bounce off the wall. The home assistance integrated in the intelligent home assistant 10H may allow a user ask the assistant to play music, answer questions, set reminders, make hands off phone calls, control smart home accessories, etc. By way of example, the intelligent home assistant 10H may be a model of an Apple HomePod with integrated home assistance model of Apple Siri software available from Apple Inc. of Cupertino, Calif.

The network interface 26 of the intelligent home assistant 10H may allow the device to connect to a network via one or more interfaces (e.g., 802.11x Wi-Fi network, Bluetooth, and/or wireless direct link to first party devices). The intelligent home assistant 10H may include an enclosure 36 to protect internal components from physical damage and to shield them from electromagnetic interference. The I/O interfaces 24 may open through the intelligent home assistant 10H and may include, for example, an I/O port for a hardwired connection to a network. Additionally, user input structures 22 may allow a user to control the intelligent home assistant 10H. For example, the input structures 22 may include a microphone that may obtain a user's voice for various voice-related features, and a speaker may enable audio playback and/or certain intelligent home assistant 10H capabilities.

Electronic devices 10A, 10B, 10C, 10D, 10E, 10F, 10G and 10H described above may all be employed in an assisted MU-MIMO wireless communication system. As mentioned above, it may be desirable for clients that are located in the same area, share mobility, share device type, and/or use similar application data usage (e.g., bandwidth), to be grouped together within the MU-MIMO wireless communication system. Indeed, in a wireless communication scenario with varying device mobility, device type, and device application data usage that would benefit from a directed communication with like clients, grouping clients based on complementary data beyond currently provided protocol data (e.g., RF characteristics) may be a useful.

While a first party or third party client may communicate protocol data to the access point on a channel, a first party client may transmit sensor data to the first party access point and/or share protocol data with a first party client on an alternative channel. The channel used to communicate protocol data may be a Wi-Fi channel. The alternative channel used by the first party clients to communicate sensor data to the access point or protocol data to first party clients, may be a wireless direct link. The wireless direct link may use a client's Bluetooth for discovery of other first party clients and then create Wi-Fi connection for transmitting and receiving data between the first party clients. Additionally or alternatively, the same data that is described below as being sent via the alternative channel may be sent via the Wi-Fi channel, but may be inaccessible (e.g., encrypted or otherwise unintelligible) to third-party devices.

Figure 10:
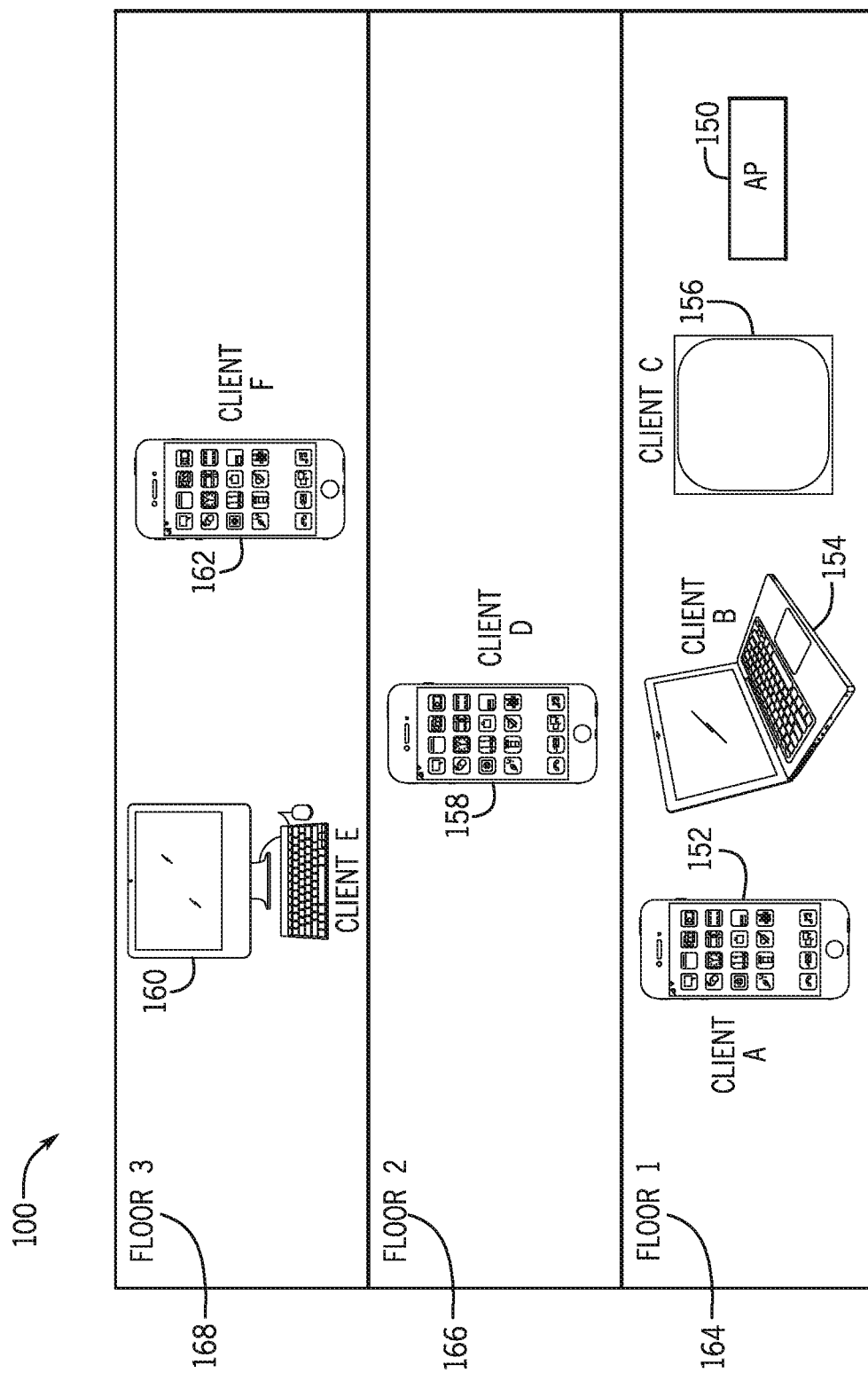
FIG. 10 is a block diagram of multiple clients in a wireless communication system, which may include the electronic device of FIG. 1, in accordance with an embodiment.

Diagram 100 in FIG. 10 illustrates a wireless communication system with clients (e.g., client A 152, client B 154, client C 156, client D 158, client E 160, and client F 162) that may benefit from grouping. In this example, there are multiple clients, client A 152, client B 154, client C 156, client D 158, client E 160, and client F 162, on different floors of a building. In the example, client A 152, client B 154, and client C 156 are disposed of in the first floor 164 (floor 1), client D 158 is disposed of in the second floor 166 (floor 2), client E 160 and client F 162 are disposed of in the third floor 168 (floor 3), and they are all connected to an access point 150 (e.g., electronic access point 10G of FIG. 8) on the first floor 164 (floor 1). Thus, clients 152, 154, 156, 158, 160, or 162 may each be in different relative locations or distances from the access point 150. Additionally, clients 152, 154, 156, 158, 160, or 162 may have different mobility type (e.g., dynamic versus static), device type, and/or application data usage, resulting in different sensor data.

As illustrated, client A 152, client D 158 and client F 162 are all portable phones, such as the hand-held device of FIG. 3. These clients 152, 158, 162 are of the same device type and they are each dynamic (e.g., not stationary). Client B 154 is a notebook computer, such as the notebook computer of FIG. 2, and it is also dynamic since a user may walk around or move the notebook without great effort. Client C 156 is a television that may be coupled to a media device, such as the media center of FIG. 7, and Client E 160 is a desktop computer, such as the desktop computer of FIG. 5. Although client C 156 and client E 160 are different devices, they may be both stationary. Thus, in an assisted MU-MIMO wireless communication system, similar clients may be grouped based on their sensor data in addition to conventional protocol data that indicates beamforming instructions based on RF characteristics of a client.

Figure 11:
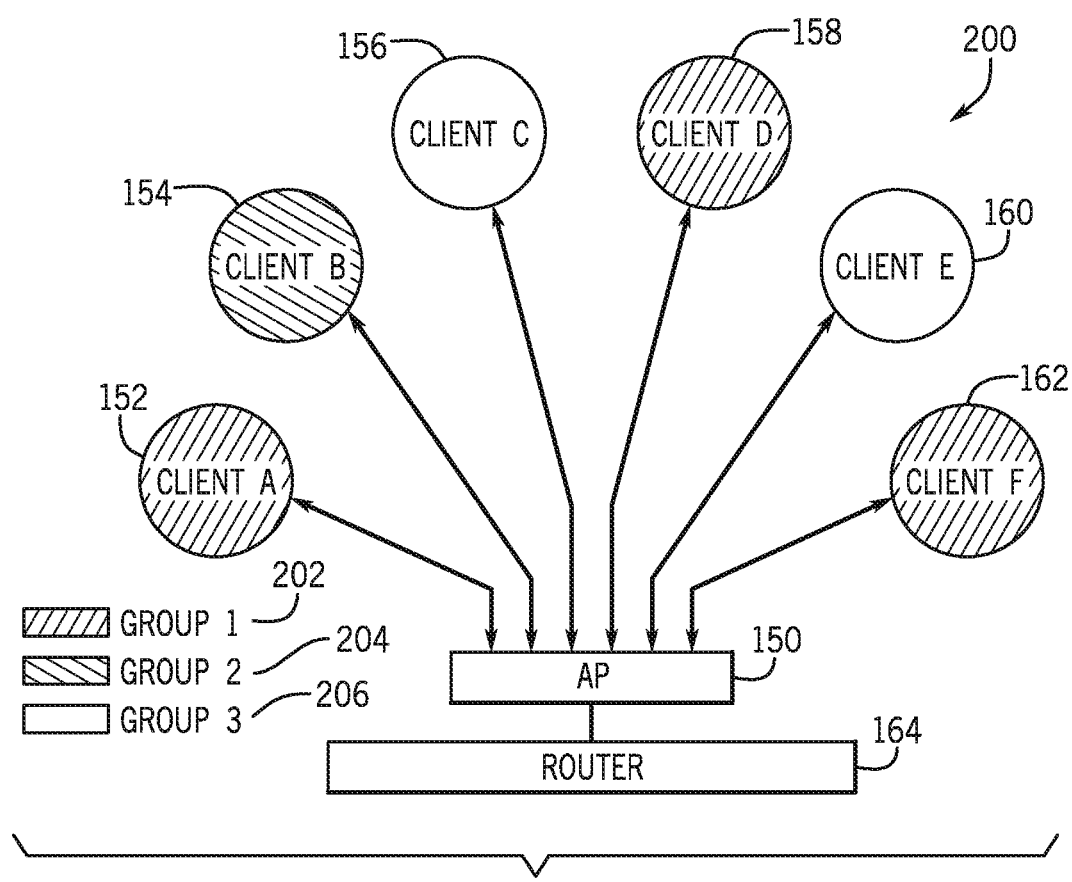
FIG. 11 is a block diagram representing grouping of multiple clients based on complementary data in the wireless communication system of FIG. 10, in accordance with an embodiment.

To illustrate, diagram 200 of FIG. 11 depicts the clients of FIG. 10 grouped based on the sensor data provided to the access point in an assisted MU-MIMO wireless communication system. As shown, multiple clients are in the same wireless network and communicating with the access point 150, which may be hardwired to a router. Client A 152, client D 158, and client F 162 are grouped together in a first group 202. The grouping feature of the assisted MU-MIMO wireless communication system may allow the access point 150 to group together client A 152, client D 158, and client F 162 since they are all portable phones, and thus, have the same device type and same mobility. The access point 150 may group client C 156, a media center device, and client E 160, a desktop computer, together in a third group 206, since both clients remain stationary, and thus, share similar sensor data (e.g., mobility). As shown, the access point may choose to group client B 154, a notebook computer, in its own individual group, a second group 204 since it does not share device type with the other clients 152, 156-162 in the wireless communication system. However, as previously mentioned, a client may be grouped with like clients based on various similar sensor data that may include mobility, device type, and/or application data usage, in addition to conventional protocol data that indicates RF characteristics of a client. Thus, since client B 154 is mobile, the access point may group client B 154 in the first group 202 with the mobile portable phones, clients A 152, client D 158, and client F 162. Thus, grouping clients (e.g., 152, 154, 156, 158, 160, 162, 164) based on sensor data, rather than limiting to conventional protocol data, allows clients that may be at varying relative distances to be grouped together. As such, grouping based on the sensor data allows for optimized MU-MIMO spectral efficiency between the access point and grouped clients since the access point is no longer trying to communicate with all clients regardless of their sensor data. Although some of the following descriptions describe sensor data related to mobility, device type, and/or application data usage which represent a particular embodiment, it should be noted that the methods and systems may be performed and implemented using any sensory information.

Figure 12A:
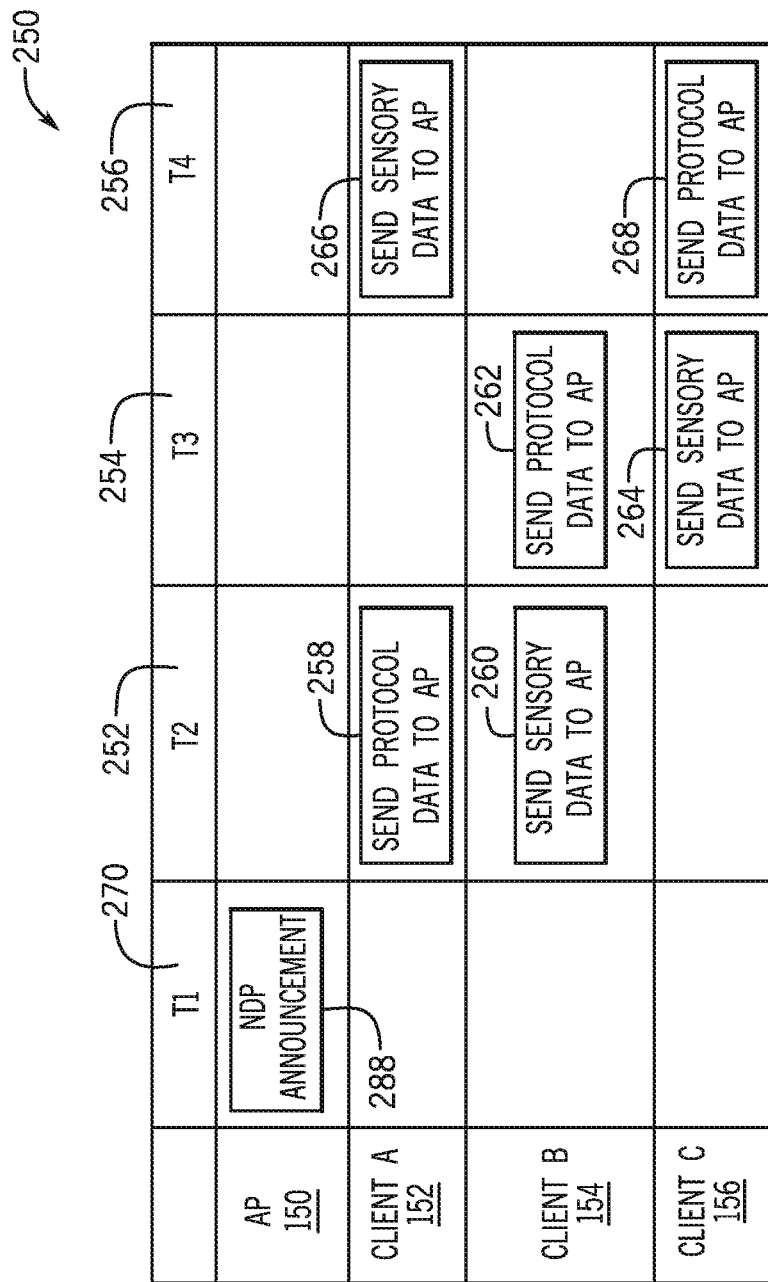
FIG. 12A is a block diagram of an assisted MU-MIMO wireless communication system with clients communicating conventional protocol data and complementary sensor data to an access point, in accordance with an embodiment.

The grouping decision in an assisted MU-MIMO wireless communication system relies on channel sounding packets (e.g., channel sounding frames), as illustrated in block diagram 250 of FIG. 12 A. The architecture of the MU-MIMO wireless communication network includes clients sending protocol data (e.g., matrix that helps determine location beamforming instructions for transmission to a client) to the access point 150. Considering sensor data may allow the access point 150 to make a more efficient grouping decision as described above.

As previously mentioned, MU-MIMO uses network beamforming, which is enabled by the support of "sounding." Sounding denotes the process performed by the transmitter (e.g., access point 150) sending out sounding frames, which may be beamformed, and the receiver (e.g., client 152) responding with a protocol data packet, which may be a compressed channel matrix of the received sounding frames. The protocol data packet may indicate how well it "heard" the signal from the antenna and may provide the information related to the RF characteristics of the wireless channel between the client receiver and the access point transmitter. Specifically, the access point 150 may use this matrix to acquire channel state information (CSI) from each of the different clients, indicating the position of the client relative to the access point 150. The CSI is effectively a collection of the spatial transfer functions between each antenna and each client terminal, containing a measure of the channel. Since a conventional MU-MIMO communication system utilizes multiple antennas, the access point 150 may control the phased antenna pattern to control both the areas where signal strength is the strongest and where it is the weakest to form a beamformed wireless data link. Gathering information via the antennas and the relative positions of each associated client allows the access point to create a phased pattern to talk to multiple clients independently and/or simultaneously.

As shown, access point 150 and three clients (client A 152, client B 154, and client C 156) are communicating in an assisted MU-MIMO wireless communication network. In a conventional MU-MIMO wireless communication network, the access point 150 may initiate a sounding sequence by transmitting a Null Data Packet Announcement (NDPA), asking clients 152, 154, and 156, for feedback. The clients review the Null Data Packet (NDP) packets (e.g., channel sounding frames), such as the frequency of the announcement, and send a compressed version of the packets (e.g., compressed beamforming (CBF)) back to the access point 150. The access point 150 may then use the feedback as the basis for determining phased antenna pattern of the signal at each antenna and other channel transmission information. In addition to the receiving protocol data over a channel as in the conventional architecture for MU-MIMO, the first party access point 150 in assisted MU-MIMO wireless communication system may receive sensor data feedback simultaneously from first party clients on an alternative channel, which may allow the access point 150 to make smarter grouping decisions.

As depicted, the assisted MU-MIMO process 250 starts off with the access point 150 sending an NDPA 288 followed by an NDP packet frame to clients 152, 154, and 156 in a first time frame 270. The NDPA identifies a queue that orders which client 152, 154, 156 will be the first to respond. As depicted, the first client in queue, client A 152, will be the first to send 258 protocol data to the access point 150 in the second time frame 252. In the same time frame and on an alternative channel, client B may send 260 sensor data, such as mobility, device type, and/or application data usage to the access point 150. As shown, both clients 152, 154 are independently communicating with the access point 150 on different channels. In the third time frame 254, the second client in the queue, client B 154, sends 262 protocol data to the access point 150 on a channel while client C 156 sends 264 sensor data to the access point 150 on an alternative channel. In the fourth time frame 256, client C 156, last in queue, sends 268 protocol data to the access point 150 on a channel while client A 152 sends 266 sensor data to the access point 150 on an alternative channel.

Providing the first party access point 150 with protocol data and sensor data concurrently in the manner described above, allows the access point 150 to make quick and efficient grouping decisions without adding delays and/or increasing latency. Thus, if a client 152, 154, 156 is determined to be grouped separately based on the sensor data provided to the access point 150, then the access point 150 may choose to exclude the client in its grouped network receiving a specific bandwidth.

Figure 12B:
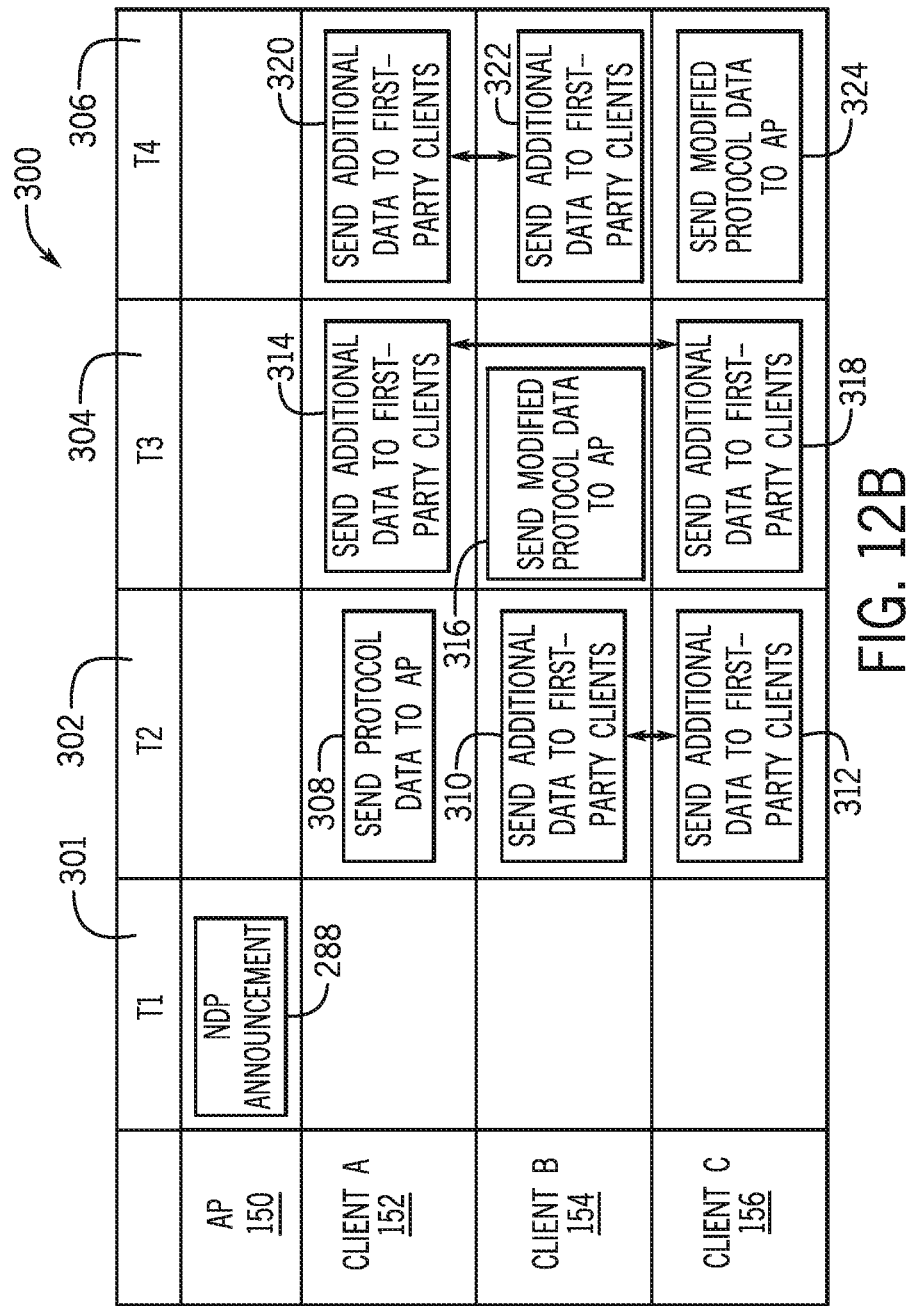
FIG. 12B is a block diagram of an assisted MU-MIMO wireless communication system with clients communicating conventional protocol data and complementary data to an access point, and communicating additional data to other clients, in accordance with an embodiment.

Block diagram 300 of FIG. 12B illustrates first party clients 152, 154, 156 in an assisted MU-MIMO wireless communication system that may communicate protocol data to first party clients and send a co-first party client's protocol data to the access point 150 (e.g., first party or third-party) as its own protocol data. Please note, the description of this embodiment may occur in conjunction to a first party access point 150 and first party clients 152, 154, 156 sharing sensor data over an alternative channel as described above in FIG. 12A.

As shown, in a first time frame 301, access point 150 may send an NDPA 288 followed by an NDP packet frame to clients 152, 154, and 156. The NDPA 288 identifies a queue that orders which client 152, 154, 156 will be the first to respond. As depicted, the first client in queue, client A 152, will be the first to send 308 protocol data to the access point 150 in the second time frame 302. In the second time frame but on an alternative channel, first party client B 154 (e.g., Apple iPad) may send 310 co-first party client C 156 (e.g., Apple iPhone) its additional protocol data, and client C 156 may also send 312 its additional protocol data to first party clients (e.g., client B 154).

Since the client B 154 and the client C 156 are both first party clients and have communicated their protocol data to each other via an alternative channel, client B 154 and client C 156 may choose to be grouped together. In the third time frame 304, client B 154 is next in queue to share protocol data to the access point 150. However, since client B 154 has exchanged protocol data with client C 156, client B 152 may modify the protocol data sent to the access point using the protocol data from client C protocol data as basis. In some embodiments, client B may send the protocol data from client C as its modified protocol data to the access point 150. At the same time frame, client A and client B may both be first party clients, and may exchange protocol data.

Similarly, in a fourth time frame 306, client C 156 may send modified protocol data 324 that is based on the information previously received by client A 152 and client B 154. In the same time frame, first party client A 152 and client B 154 may exchange protocol data. Thus, when first party clients 152, 154, 156 communicate their protocol data to each other, any one of the first party clients 152, 154, 156 may use the learned protocol data to send as modified protocol data to the access point 150. Effectively, this allows first party clients 152, 154, 156 that may want to be grouped together to prevent the access point 150 from either not grouping the first party clients 152, 154, 156 or grouping them differently than if the grouping decision was limited to sensor data or the client's actual protocol data.

Figure 13A:
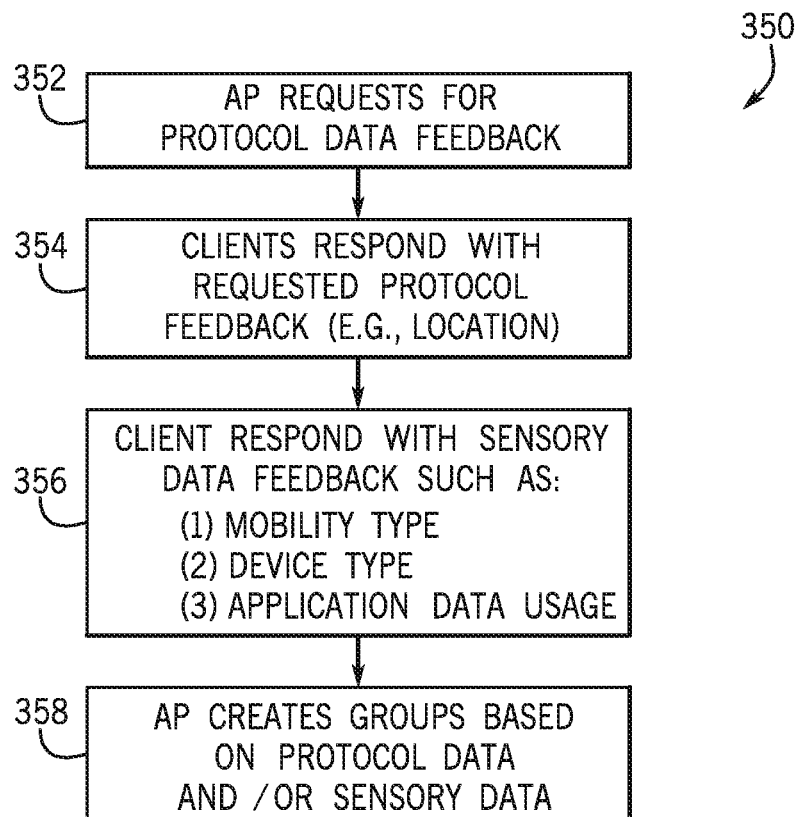
FIG. 13A is a flow diagram of an assisted MU-MIMO wireless communication system with clients grouped based on complementary data, in accordance with an embodiment.

To summarize the processes of grouping based on sensor data, flow diagram FIG. 13A illustrates the process 350 of an assisted MU-MIMO wireless communication system with a first party access point 150 receiving sensor data from first party clients. The access point 150 requests (block 352) protocol data feedback from clients. As previously mentioned, the access point 150 broadcasts an NDPA followed by NDP packets to have all clients set in a queue, and ready to send protocol data feedback. The clients respond (block 354) with the requested protocol feedback. The requested feedback provides the access point 150 with the clients' RF characteristics based on signal strength between the compressed NDP packets transmitted from the clients back to the access point 150. The clients may also send (block 356) sensor data feedback, such as mobility type (e.g., dynamic versus static), device type, and/or application data usage (e.g., high RSSI versus medium RSSI versus low RSSI). Based on the protocol data and/or sensor data received, the access point 150 creates (block 358) groups of clients. As discussed above, blocks 354 and 356 may be performed concurrently.

Figure 13B:
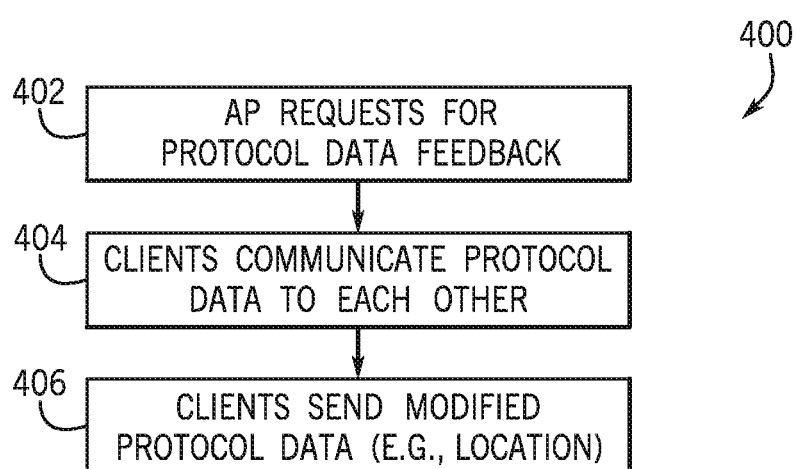
FIG. 13B is a flow diagram of an assisted MU-MIMO wireless communication system with clients sending modified protocol data feedback, in accordance with an embodiment.

For grouping based on additional protocol data knowledge, flow diagram FIG. 13B illustrates the process 400 of an assisted MU-MIMO wireless communication system with first party clients sharing each other's protocol data to coordinate protocol data sent to the first party or third-party access point 150. As illustrated, the access point 150 requests (block 402) client protocol data. As mentioned above, the access point 150 sends out an NDPA followed by NDP packets to have all clients set in a queue, ready to send protocol data feedback. While a client may transmit its protocol data on a channel to the access point 150, the first party clients may communicate (block 404) their protocol data with each other on an alternative channel (e.g., Apple Wireless Direct Link). In this manner, a first party client may obtain the protocol data of its first party clients. All the first party clients may coordinate their grouping rather than allowing the access point 150 to use its algorithms to determine grouping. Thus, when the next first party client sends (block 406) its protocol data to the access point 150, the protocol data may be modified to coordinate the grouping. In this manner, first party clients in a network may independently choose to be grouped together by giving the access point 150 the same protocol data. Additionally, by sharing their co-first party client's protocol data to the access point 150, first party clients may make themselves unavailable for grouping with others that the access point 150 may have grouped them with based on sensor data or protocol data. Such a scenario may arise when there is a privacy concern. For example, clients may not want to send their information to an unknown access point 150 (e.g., an access point that the client has not communicated with in the past) when the access point 150 may send its information to a cloud instance. Thus, the first party clients may take themselves out of the grouping feature of the assisted MU-MIMO wireless communication system by the described process 400.

Figure 14:
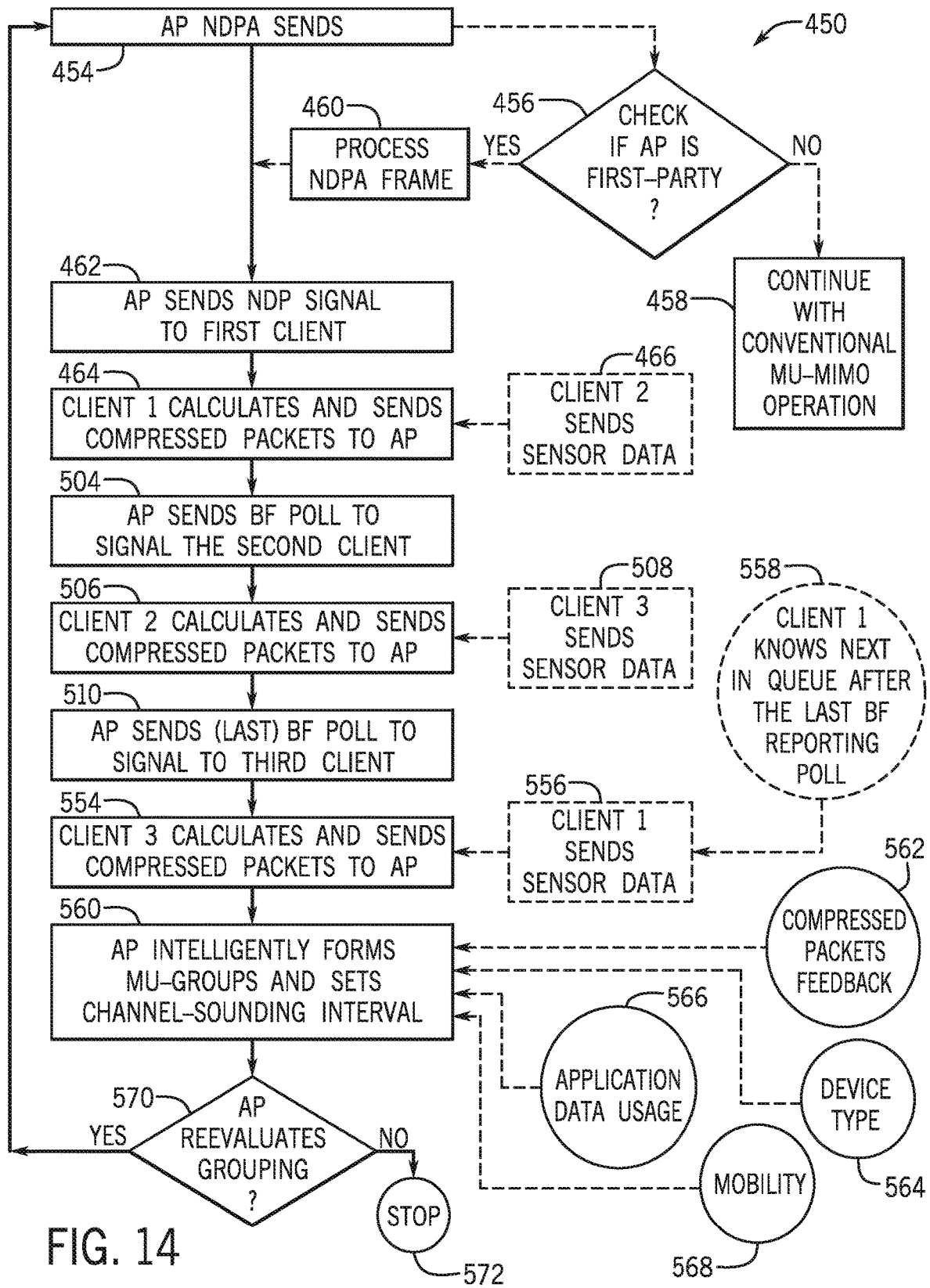
FIG. 14 is a flow diagram of an assisted MU-MIMO wireless communication system before grouping clients, in accordance with an embodiment.

Flow diagram FIG. 14 illustrates the process 450 of clients (e.g., 152, 154, 156) communicating with an access point 150 that may be a first party or a third-party device before grouping. As shown, an access point 150 may send (block 454) an NDPA, broadcasting a channel-sounding frame. The first party clients 152, 154, 156 in the network may check (decision block 456) if the sounding frame was broadcasted from a first party access point 150. If the first party clients 152, 154, 156 determine that the sounding frame came from a third-party access point 150, then clients 152, 154, and 156 may continue (block 458) to function in a conventional MU-MIMO operation by sending conventional protocol data.

However, if the first party clients 152, 154, 156 determine that the access point 150 is also a first party device, then clients 152, 154, and 156 may process (block 460) the NDP packets. Processing the packets may determine the number of stations in the Multi-User (MU) channel sounding and the order of clients 152, 154, 156 for sending sensor data by the alternative channel. Since clients 152, 154, and 156 and access point 150 are first party devices, the access point 150 may receive sensor data from a first party client (e.g., 152) while simultaneously receiving protocol data from another client (e.g., 154), and additional protocol data may be communicated between the available first party clients (e.g., 156), as previously described in FIG. 13A and FIG. 13B.

The access point 150 may send (block 462) an NDP signal to the first client in queue, as determined by the access point 150 when the NDPA was sent. This signal communicates to the client 152 to be ready to send compressed packets feedback, relaying channel state information by the spatial transfer functions between the access point 150 antenna and client 152 terminal, indicating RF characteristics of client 152 to the access point 150. Once the first client 152 receives the NDP signal, the first client 152 may calculate (block 464) the compressed packets based on the NDP packets received and sends it to the access point 150.

Based on the compressed packets received by its antennas, the access point 150 may determine the RF characteristics of the client 152 based on signal strength when the packet is received. Since the devices in this embodiment are first party devices, while the first client may send protocol data on a channel, a second first party client 154 simultaneously may send (block 466) sensor data to the first party access point 150 on an alternative channel.

After receiving the protocol data from the first client 152 and sensor data from a second first party client 154 in the same time frame, the access point 150 may send (block 504) a beamformer report poll (BF Poll) frame to signal to the second client 154, next in queue to send protocol data, to be ready to send compressed packets feedback. After receiving the BF Poll frame, the second client 154 in queue may calculate (block 506) the compressed packets based on the NDP packets received, and send it to the access point 150. Based on the compressed packets received by its antennas, the access point 150 may determine the RF characteristics of the second client 154 based on signal strength when the packet is received. While the second client 154 may send protocol data on a channel, a third first party client 156 may simultaneously send (block 508) sensor data to the access point 150 on an alternative channel.

The access point 150 may continue sending BF Poll signals to the next client 156 in queue to receive protocol data on a channel, while another first party client 152 may send sensor data simultaneously on an alternative channel. Accordingly, if the third client 156 is the last client, the access point 150 may send (block 510) the last BF Poll signal to the last client to be ready to send compressed packets feedback. After receiving the BF Poll frame, the last client 156 in queue may calculate (block 554) the compressed packets based on the NDP packets received, and send it to the access point 150. Based on the compressed packets received by its antennas, the access point 150 may determine the RF characteristics of the third client 156 based on signal strength when the packets are received.

While the third client 156 may send protocol data on a channel, the first client 152 simultaneously may send (block 556) sensor data to the access point 150 on an alternative channel. The first client 152 may have been notified 558 that it is next in queue to send sensor data based on the last BF Poll signal. After receiving protocol data and sensor data from the multiple clients 152, 154, 156 within the assisted MU-MIMO wireless communicate system, the first party access point 150 may intelligently form (block 560) MU-groups and sets interval channel sounding.

The data received from clients 152, 154, 156 simultaneously over multiple channels may include the compressed packets feedback 562 from clients 152, 154, and 156, sensor data feedback such as, device type data 564, application data usage 566 (e.g., high RSSI versus medium RSSI versus low RSSI, indicating priority of device information), and mobility data 568 (e.g., dynamic versus static). The access point 150 may also reevaluate grouping (decision block 570) after an interval channel sounding based. The reevaluation may take place based on changes in the data received that may be associated with a less-than-optimal MU gain. The data change may indicate changes in the RF characteristics of clients contained in the compressed packets feedback 562, RF characteristics of a device type 564, application data usage 566 of clients, and/or mobility 568 of clients. The access point 150 may calculate optimized gain and thus, the access point 150 may keep current grouping (block 572). On the other hand, if the access point 150 calculates less-than-optimal MU gain utilized, then the access point 150 may reevaluate grouping and start the evaluation process over again.

Figure 15:
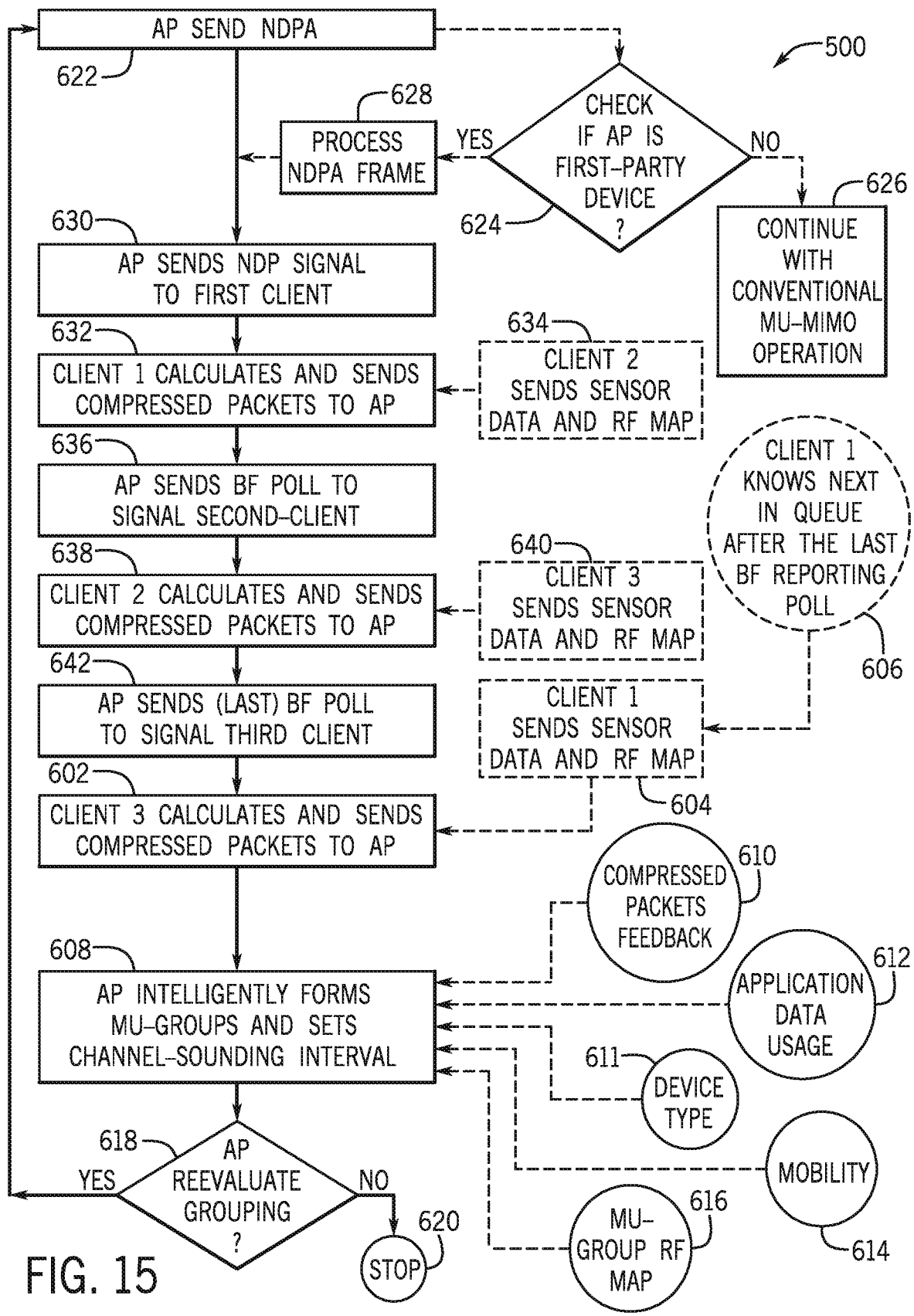
FIG. 15 is a flow diagram of grouped clients communicating in a MU-MIMO wireless communication system, in accordance with an embodiment.

Flow diagram FIG. 15 illustrates the process 500 of first party access point 150 grouping first party clients (e.g., 152, 154, 156) and creating a radio frequency (RF) map based on the grouping. The RF map may indicate clients 152, 154, 156 in the network, grouping, and frequency usage. This information from the RF map may allow for better planning and allocation of channel usage and grouping. As shown, an access point 150 may send (block 622) an NDPA, broadcasting a channel-sounding frame. The first party clients 152, 154, 156 in the network may check (decision block 624) if the sounding frame was broadcasted from a first party access point 150. If the first party clients 152, 154, 156 determine that the sounding frame came from a third-party access point 150, then clients 152, 154, and 156 may continue (block 626) to function in a conventional MU-MIMO operation by sending protocol data.

However, if the first party clients 152, 154, 156 determine that the access point 150 is also a first party device, then clients 152, 154, and 156 may process (block 628) some or all of the NDP packets. Processing the packets may determine the number of stations in the Multi-User (MU) channel sounding and the order of clients 152, 154, 156 sending sensor data by the alternative channel. Since clients 152, 154, and 156, and access point 150 may be first party devices, the access point 150 may receive sensor data from a first party client 154 while simultaneously receiving protocol data from another client 152, and additional data may be communicated between the first party clients 156, as previously described in FIG. 13B.

The access point 150 may send (block 630) an NDP signal to the first client 152 in queue, as determined by the access point 150 when the NDPA was sent. This signal may communicate to the client 152 to be ready to send compressed packets feedback, relaying channel state information (CSI) by the spatial transfer functions between the access point 150 antenna and client 152 terminal, indicating RF characteristics of client 152 to the access point 150. Once the first client 152 receives the NDP signal, the first client 152 may calculate (process block 632) the compressed packets based on the NDP packets received, and send it to the access point 150. Based on the compressed packets received by its antennas, the access point 150 may determine the RF characteristics of the client 152 based on signal strength when the packet is received. Since the devices in this embodiment are first party devices, while the first client 152 may send protocol data on a channel, a second first party client 154 may simultaneously send (block 634) sensor data and RF map data to the first party access point 150 on an alternative channel.

After receiving the protocol data from the first client 152 and sensor data from a second first party client 154 in the same time frame, the access point 150 may send (block 636) a beamformer report poll (BF Poll) frame to signal to the second client 154, next in queue to send protocol data, to be ready to send compressed packets feedback. After receiving the BF Poll frame, the second client in queue may calculate (process block 638) the compressed packets based on the NDP packets received, and send it to the access point 150. Based on the compressed packets received by its antennas, the access point 150 may determine the RF characteristics of the second client 154 based on signal strength when the packets are received. While the second client 154 may send protocol data on a channel, a third first party client 156 may simultaneously send (block 640) sensor data and RF map data to the access point 150 on an alternative channel.

The access point 150 may continue sending BF Poll signals to the next client 156 in queue to receive protocol data on a channel, while another first party client 152 may send sensor data simultaneously on an alternative channel. Accordingly, if the third client 156 is the last client 156, the access point 150 may send (block 642) the last BF Poll signal to the last client 156 to be ready to send compressed packets feedback. After receiving the BF Poll frame, the last client 156 in queue may calculate (block 602) the compressed packets based on the NDP packets received, and send it to the access point 150. Based on the compressed packets received by its antennas, the access point 150 may determine the RF characteristics of the third client 156 based on signal strength when the packets are received.

While the third client 156 may send protocol data on a channel, the first client 152 may simultaneously send (block 604) sensor data and RF map data to the access point 150 on an alternative channel. The RF map may indicate channel usage and RF characteristics, which may assist the access point 150 when grouping and/or reevaluating grouping. The first client 152 may have been notified 606 that it is next in queue to send sensor data based on the last BF Poll signal. After receiving protocol data and sensor data from the multiple clients 152, 154, 156 within the assisted MU-MIMO wireless communicate system, the first party access point 150 may intelligently form (block 608) MU-groups and sets interval channel sounding.

The data received from clients 152, 154, 156 simultaneously over multiple channels may include the compressed packets feedback 610 from clients 152, 154, and 156, sensor data feedback such as, device type data 611, application data usage 612 (e.g., high RSSI versus medium RSSI versus low RSSI, indicating priority of device information), mobility data 614 (e.g., dynamic versus static), and MU-group RF map data 616. However, the access point 150 may choose to reevaluate (decision block 618) grouping based, for example, on a data change, such as less-than-optimal MU gain. The data change may indicate a change in compressed packets feedback 562 from clients, RF characteristics of a device type 564, application data usage 566 of clients, and/or mobility 568 of clients. The access point 150 may calculate optimized gain and thus, the access point 150 may choose to keep current grouping (block 620). On the other hand, if the access point 150 calculates less-than-optimal MU gain utilized, then the access point 150 may reevaluate grouping and start the evaluation process over again.

Figure 16:
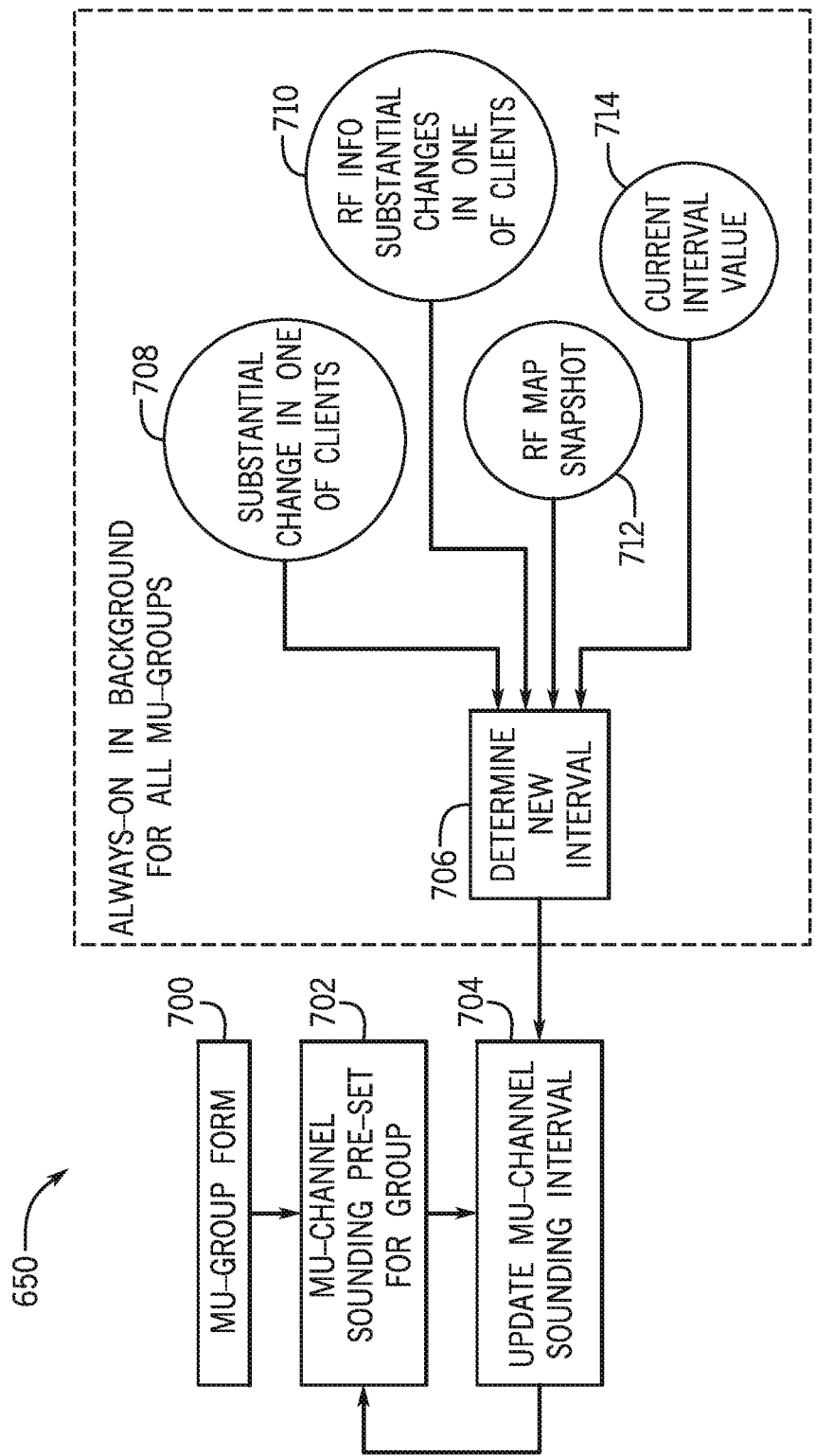
FIG. 16 is a process flow diagram of updating grouped clients based on channel sounding intervals in a MU-MIMO wireless communication system, in accordance with an embodiment.

The access point 150 may create and update groups in the process 650, as illustrated in FIG. 16. The access point 150 may form (block 700) an MU-group for a set of clients based on various data received, as previously discussed. After forming an MU-group, the access point 150 may send channel-sounding packets at periodic intervals. The intervals may, in block 702, be pre-set or determined via an algorithm of a design software used to configure the access point 150. The interval time may vary depending the basis of the grouping, such as if the grouping is based on all the same device type (e.g., 4K TVs) and/or application data usage (e.g., high RSSI), etc.

After the access point 150 sends out the channel sounding packets, the access point may update (block 704) the channel sounding packet interval frequency to an interval frequency greater or smaller than the previous interval. The access point may, in block 706, determine a new frequency interval based on various data that is received for all MU-groups at all times. The data used to determine the new interval may relate to a substantial change in at least one client (e.g., 152) in the group 708, a substantial change in the RF data 710 (e.g., RSSI or SNR) of at least one client 152 of the group, an RF map snapshot 712, and the current value for interval time 714. The threshold to determine a substantial change in this data may include a pre-determined threshold via an algorithm of design software to configure the access point 150. In this manner, when there is a substantial change in one client 152 or clients of the group, the access point 150 may update channel sounding packet intervals to the appropriate interval. The access point 150 may additionally consider this information when reevaluating grouping.

Figure 17:
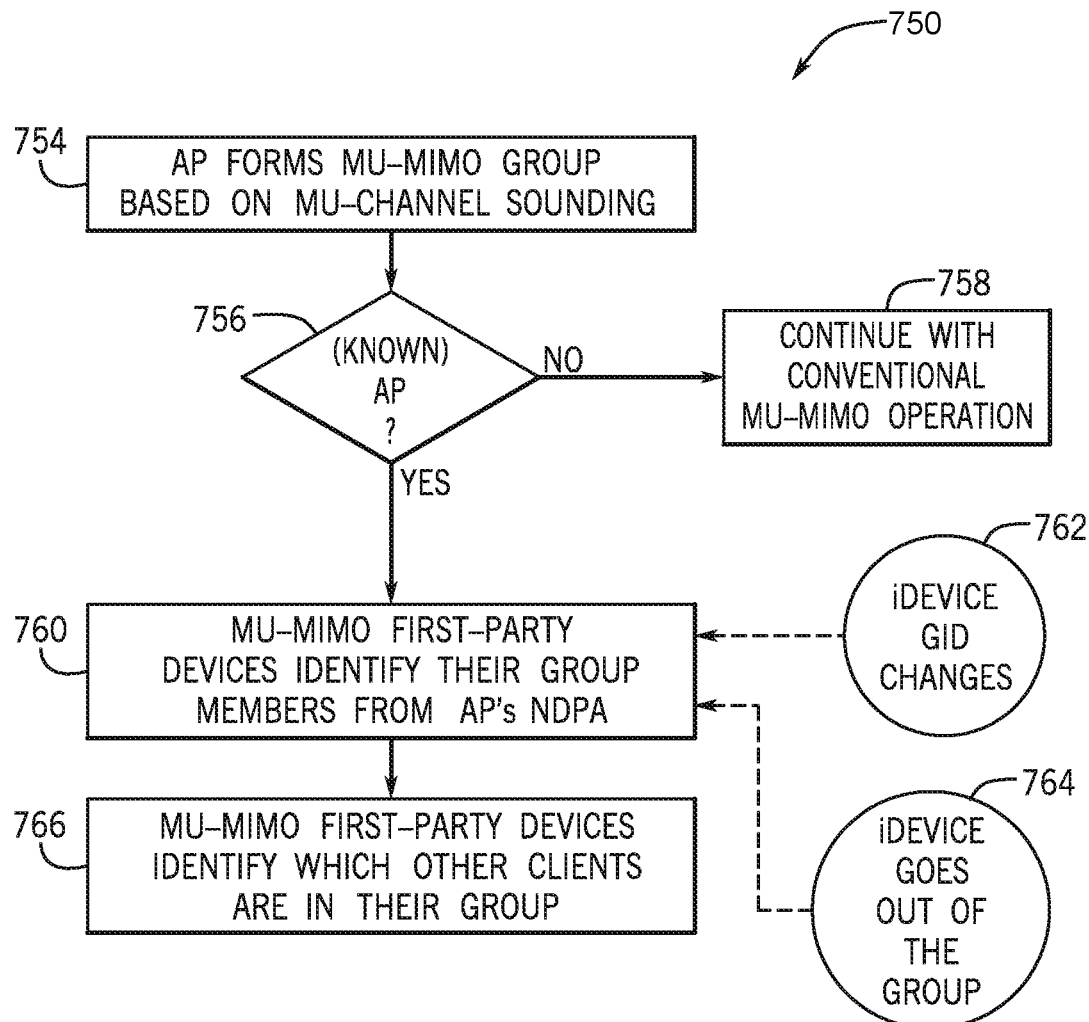
FIG. 17 is a process flow diagram of clients excluding themselves from grouping based on an access point identification, in accordance with an embodiment.

As previously mentioned, first party clients may choose to group or otherwise coordinate themselves with other first party clients. On the other hand, first party clients may also choose to exclude themselves from an unknown wireless access point 150 in an assisted MU-MIMO wireless communication. The process 750 of first party clients analyzing the access point 150 identification (ID) and co-first party client IDs in the network, and choosing to exclude themselves, is illustrated in FIG. 17. The access point 150 may form (block 754) groups of clients based on the various data, such as based on channel sounding packets (e.g., indicating RF characteristics of clients). Once the clients have been grouped, the first party clients in the network may check (decision block 756) if the channel sounding frame was broadcasted from a known access point 150. The access point 150 may be a known access point if a client of the group has connected to the access point 150 in the past. For example, a mobile phone may connect to a network at home using an access point 150. The mobile phone may then travel out of channel range for the access point 150 and lose connection. However, the mobile phone may automatically reconnect with the same access point 150 upon reentering the channel range. The access point 150 in the described scenario may be a known access point 150 since the mobile phone had connected with the same access point 150 in the past.

If the first party clients determine that the channel sounding frame came from an unknown access point 150, then the clients may continue (block 758) to function in a conventional MU-MIMO operation by sending protocol data over a channel by sending their own protocol data or modified protocol data, as described in FIG. 12B. However, if the first party clients determine that the access point 150 is a known access point 150, then the first party clients may identify (block 760) other grouped clients using the access point's 150 NDP packets. As previously mentioned, the sounding and feedback protocol starts with the access point 150 sending an NDPA frame followed by the NDP, which tells the client its position in the queue to send protocol data to the access point 150. The clients may use this NDP data to determine grouped clients from the queue. The clients and/or group may receive a unique identification (ID) from the access point 150. The group ID (GID) may include, but is not limited to, a unique string of characters, a name, or number (1-100) to identify the group. While identifying the grouped clients, the clients consider any changes in the first party client group ID 762 or first party clients that may leave the group 764, or go out of range. Thus, by actively analyzing which clients share a group ID 762 or if a client goes out of the group 764, the first party clients in the assisted MU-MIMO wireless communication system identify (block 766) which other clients, if any, are in the group ID.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An electronic device comprising:
a network interface;
a processor communicatively coupled to the network interface; and
a memory comprising computer-readable instructions to form a set of groups of a wireless communication system, wherein the computer-readable instructions cause the electronic device to:
send, using the network interface, a sounding frame via a channel of the wireless communication system to a first client of the wireless communication system;
receive, using the network interface, protocol data via the channel from the first client, wherein the protocol data is based at least in part on the sounding frame;
receive, using the network interface, complementary data via a wireless direct link from the first client, wherein the complementary data comprises a mobility characteristic of the first client, application data usage of the first client, a device type of the first client, or any combination thereof;
form, in the processor, a first group of the set of groups based on the protocol data and the complementary data, wherein the first group comprises the first client and the first group is associated with a first beamformed data link; and
adjust, in the processor, bandwidth usage to the first group based on the protocol data and the complementary data.

2. The electronic device of claim 1, wherein the protocol data is configured to indicate RF characteristics of the first client with respect to the electronic device.

3. The electronic device of claim 1, wherein the complementary data comprises application data usage of the first client.

4. The electronic device of claim 1, wherein the computer-readable instructions cause the electronic device to receive second protocol data from a second client, and wherein the complementary data from the first client and the second protocol data from the second client are received concurrently.

5. The electronic device of claim 4, wherein the first client comprises a first party device, wherein the second client comprises a third party device, wherein the first party device is configured to access the channel, the wireless direct link, or a combination thereof, and wherein the third party device is configured to access the channel.

6. The electronic device of claim 1, wherein the channel comprises an Institute of Electrical and Electronics Engineers (IEEE) 802.11 compliant channel or a Wi-Fi channel.

7. The electronic device of claim 1, wherein the wireless direct link comprises an APPLE WIRELESS DIRECT LINK (AWDL), a BLUETOOTH link, or an AIRDROP link, or any combination thereof.

8. The electronic device of claim 1, wherein the electronic device comprises a router or an access point.

9. A method to form a set of groups of a network, comprising:
broadcasting, from an access point of the network, sounding packets to a plurality of client devices of the network via a channel of the network;
receiving, in the access point, a respective protocol packet from each respective client device of the plurality of client devices via the channel of the network, wherein each respective protocol packet is sent by the respective client device in response to a respective sounding packet received by the respective client device, wherein a first portion of the plurality of client devices comprises one or more first party devices while a second portion of the plurality of client devices comprises one or more third party devices;
receiving, in the access point via a wireless direct link of the network, complementary packets from each of the one or more first party devices, wherein the complementary packets comprise a mobility characteristic of each of the one or more first party devices, application data usage of each of the one or more first party devices, a type of each of the one or more first party devices, or any combination thereof; and
grouping, via the access point, the plurality of client devices into the set of groups by placing each client device of the plurality of client devices into a respective group of the set of groups based at least on received protocol packet and received complementary packet, wherein each respective group is associated with a respective beamformed data link, wherein the one or more first party devices are configured to access the wireless direct link, the channel, or a combination thereof, and wherein the one or more third party devices are configured to access the channel.

10. The method of claim 9, wherein the respective sounding packet is configured to obtain RF characteristics of the respective client device, wherein the RF characteristics comprise data indicative of a respective wireless channel connection established between the access point and the respective client device.

11. The method of claim 9, comprising:
receiving, via the access point, a first respective protocol packet from a first client device of the one or more first party devices in a first group; and
placing, via the access point, a second client device of the one or more first party devices in a second group distinct from the first group, wherein the first client device provides the first respective protocol packet to the second client device via the wireless direct link of the network.

12. The method of claim 9, wherein the channel comprises an Institute of Electrical and Electronics Engineers (IEEE) 802.11 compliant channel or a Wi-Fi channel, and wherein the wireless direct link comprises a APPLE WIRELESS DIRECT LINK (AWDL), a BLUETOOTH link, or an AIRDROP link, or any combination thereof.

13. The method of claim 9, wherein grouping the plurality of client devices into the set of groups comprises creating, via the access point, a radio frequency map configured to indicate grouping and channel usage of each client device of the plurality of client devices.

14. A non-transient, computer readable medium comprising instructions that, when executed by a processor of an electronic device cause the processor to:
receive, using a network interface coupled to the processor, a sounding frame from an access point of a wireless communication system, wherein the sounding frame is received via a channel of the wireless communication system;
send, using the network interface, a protocol data packet to the access point via the channel, wherein the protocol data packet is based on the sounding frame; and
send, using the network interface, a complementary data packet to the access point via a wireless direct link of the wireless communication system, wherein the complementary data packet comprises sensor data indicating mobility of the electronic device, application data usage of the electronic device, electronic device type, or any combination thereof, wherein the access point forms a group based on the protocol data packet and the complementary data packet, wherein the group comprises the electronic device, and wherein the access point adjusts bandwidth usage to the group based on the protocol data packet and the complementary data packet.

15. The computer readable medium of claim 14, wherein sending the complementary data packet to the access point comprises verifying that the access point comprises a first party access point based at least in part on the sounding frame.

16. The computer readable medium of claim 14, wherein the sensor data comprises the electronic device type.

17. The computer readable medium of claim 14, wherein the instructions are configured to cause the processor to verify that the access point comprises a known access point.

18. The computer readable medium of claim 14, wherein sending the protocol data packet via the channel and sending the complementary data packet via the wireless direct link are concurrent.

19. The computer readable medium of claim 14, wherein the instructions are configured to cause the electronic device to send a second protocol data packet to a second electronic device of the wireless communication system.

20. The method of claim 11, comprising:
receiving, via the access point, the first respective protocol packet from the second client device; and
updating, via the access point, the first group to comprise the first client device and the second client device in response to receiving the first respective protocol packet from the second client device.

* * * * *